United States Patent [19]

Hager

[11] 4,362,354

[45] Dec. 7, 1982

[54] TWO-AXIS MOUNTING STRUCTURE FOR A TELESCOPE

[75] Inventor: Karl-Heinz Hager, Heidenheim, Fed. Rep. of Germany

[73] Assignee: Carl Zeiss-Stiftung, Oberkochen, Fed. Rep. of Germany

[21] Appl. No.: 173,392

[22] Filed: Jul. 29, 1980

[30] Foreign Application Priority Data

Aug. 8, 1979 [DE] Fed. Rep. of Germany ....... 2932085

[51] Int. Cl.³ ............................................. G02B 23/16
[52] U.S. Cl. ..................................... 350/83; 248/183
[58] Field of Search ............................. 350/82, 83, 85; 248/183, 278; 353/3

[56] References Cited

U.S. PATENT DOCUMENTS

| | | | |
|---|---|---|---|
| 1,118,564 | 11/1914 | Lupton, Jr. ............................. | 350/83 |
| 2,003,171 | 5/1935 | Burrell ................................. | 350/83 |
| 2,948,189 | 8/1960 | Fischer ............................. | 350/83 X |
| 3,942,865 | 3/1976 | Rand .................................... | 350/83 |

Primary Examiner—John K. Corbin
Assistant Examiner—Matthew W. Koren
Attorney, Agent, or Firm—Hopgood, Calimafde, Kalil, Blaustein & Judlowe

[57] ABSTRACT

The invention contemplates an improved two-axis mount or adapter whereby a telescope may be mounted to a given base structure, for precise polar-axis motion and/or declination-axis motion. This is achieved in a unit-handling structure wherein a single housing provides rugged, wide-based journal support for each of two elongate shafts, orthogonally oriented and at close-clearance offset where their directions cross within the housing. One of these shafts has externally projecting provision for fixedly securing the same to desired base structure, and the other shaft has externally projecting provision for securing the telescope thereto.

7 Claims, 3 Drawing Figures

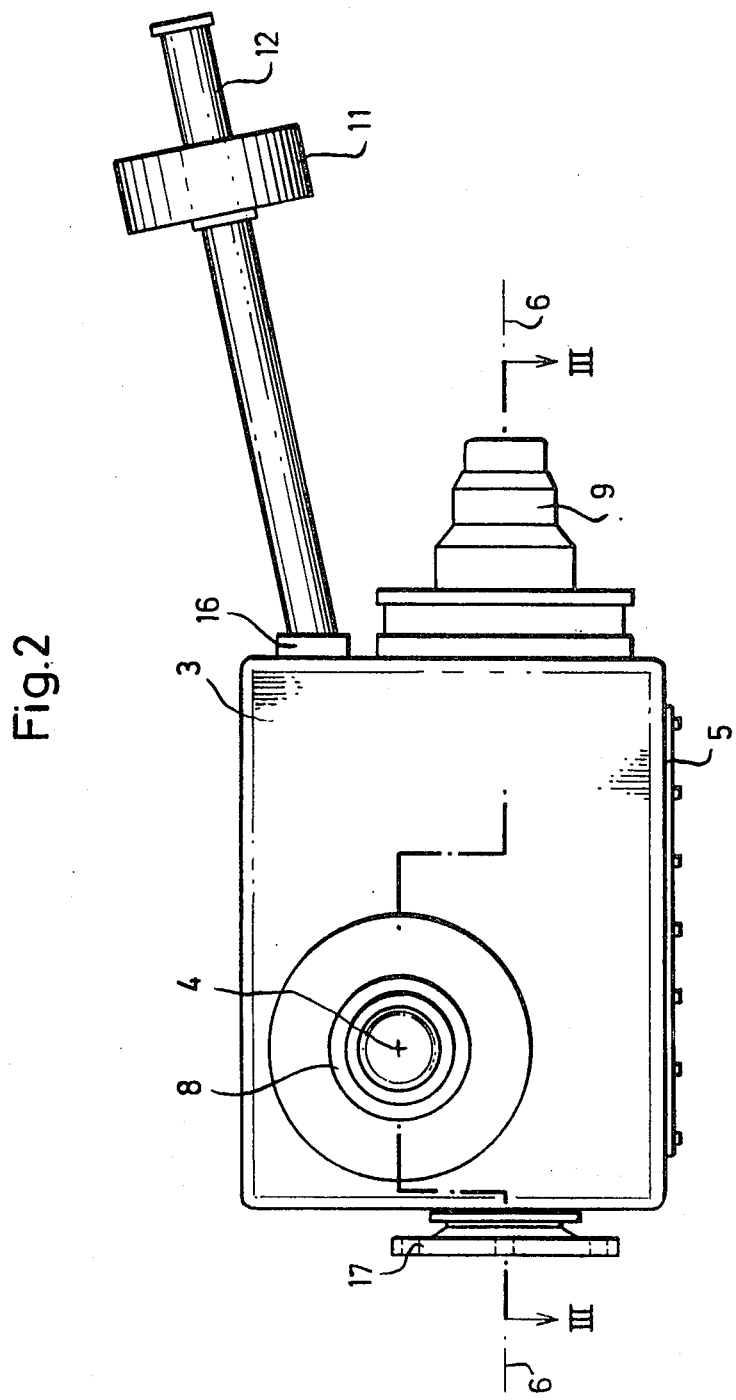

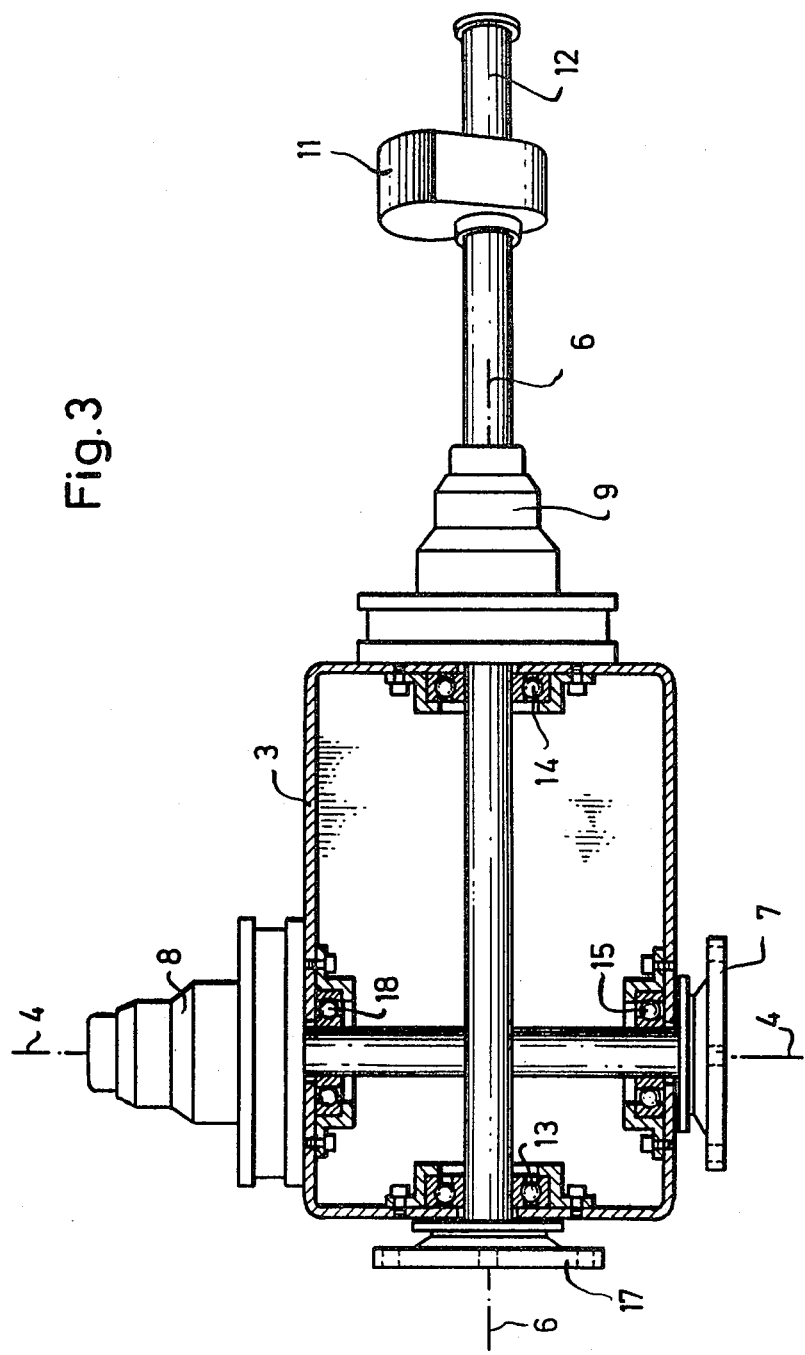

TWO-AXIS MOUNTING STRUCTURE FOR A TELESCOPE

BACKGROUND OF THE INVENTION

The invention relates to a mount for telescopes. Such mounts consist primarily of the supports for two shafts which are perpendicular to each other; one of the shafts is connected with a fixed base while the second is connected with the telescope, and the shafts have separate drives by which the telescope can be swung for observation.

In presently known mounts, the supports for the polar shaft and for the declination shaft are contained in separate assemblies which are at a relatively large distance in space from each other. These arrangements, as described, for instance, in West German Pat. No. 1,940,657, result in a rather substantial manufacturing expense since both support components must be manufactured with the high precision which is necessary for tracking by astronomical telescopes. The same requirements as to precision are also present in connection with the mounting of the telescope, i.e., the orientation of the two assemblies with respect to each other.

In addition to the requirements as to precision in connection with the manufacture and mounting, it must be borne in mind that the weight of the telescope in the context of correspondingly large distances between the two assemblies may cause elastic deformations of the mount, which deformations can be kept within reasonable limits only at high expense.

BRIEF STATEMENT OF THE INVENTION

The object of the present invention is to create a telescope mount which permits economic manufacture with maximum precision.

The invention achieves this object by providing a single housing for support of the shafts for both axes of rotation, said shafts being in offset right-angle relation to each other, and passing each other within the housing at a minimum distance apart.

In this way, the result is obtained that the supports for both shafts can be produced in a single machine-tool set-up. The precision of rotary-axis orientation is thus dependent only on the precision of the machine tool; one avoids the prior severe requirements necessary to assure perpendicularity of the two axes. The invention also enables elastic deformations to be minimized, since the common housing restricts the flow of force to a small space.

The distance apart of the two axes should for the same reason be kept as small as possible and should only be as large as the shaft diameters require.

In order to achieve utmost stability, the housing can be suitably ribbed on the inside.

By using compactness in a two-axis mount (Kreuzkopfmontierung), easy overall construction is obtained. Only a simple base is required which bears the mount and which is independent of the supports for the two shafts. Thus, a base can be used with shape determined solely by the desire of the user, subject to the sole requirement of providing mount-receiving means which is adapted to the polar angle or, in the case of azimuth mounting, to the vertical.

Since the mount of the invention involves rotary axes that do not lie in the same plane, compensation must be provided for both the imbalance of the load (telescope) and the imbalance which results from the offset distance of the two rotary axes from each other. For this purpose, a single counterweight is contemplated, with two possible degrees of freedom for its adjustable displacement.

It is advantageous to develop the shaft drives as gearless direct drives arranged inside or outside the housing of the mount, for logical consistency with the simplicity of the two-axis mount. High precision of the arrangement is in this way assured for long periods of time, since no gear play can result.

DETAILED DESCRIPTION

The invention will be illustratively described in further detail, with reference to the accompanying drawings, in which:

FIG. 2 is a plan view of the mount shown in FIG. 1, as seen parallel to the polar axis; and FIG. 3 is a partial section through the mount of FIG. 1, taken along the line III—III of FIG. 2.

Figure 1:
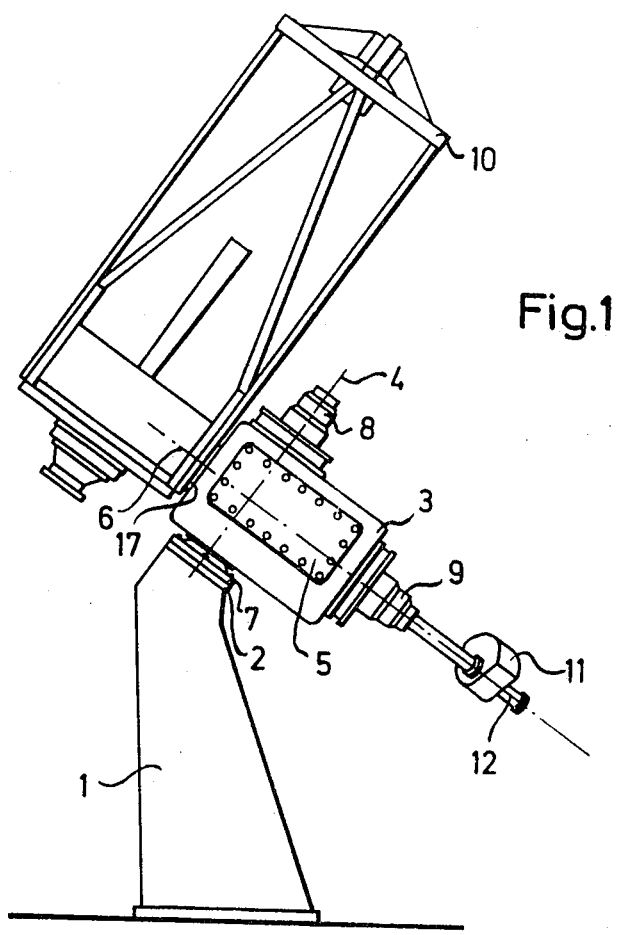
FIG. 1 is a simplified side view in elevation of a telescope provided with a mount of the invention.

The mounted telescope of FIG. 1 derives fixed-reference support from a base 1 with mount-receiving means 2 which is so developed that the normal 4 to the receiving surface for a two-axis mount 3 is directed towards the celestial pole. The mount 3 consists of a rectangular housing which is provided with a removable closure cover 5 and has two bearings for the polar shaft 4 and two for the declination shaft 6. One end of the polar shaft 4 carries a mounting flange 7 by which shaft 4 is secured to the receiving surface of means 2 of the base 1. The opposite end of shaft 4 is coupled to a motor 8 by which the mount 3 can be rotationally displaced about the stationary polar axis 4.

A second motor 9 is coupled to the declination shaft 6 for second-axis swinging of the telescope 10, which is fastened to shaft 6 via a flange 17. Instead of the reflecting telescope 10 shown here, a refractor can, of course, also be used.

The shafts 4 and 6 are preferably driven directly by motors 8 and 9, without the use of gearing. For the highly precise course of motion which is necessary, for instance, for keeping the telescope pointed at an observed object, commercially available controls can be used, which will be understood to include tachometer generators, incremental-motion transmitters, and the like, arranged on the shafts 4 and 6.

As shown in FIGS. 2 and 3, the offset shafts 4 and 6 pass by each other with minimum distance apart and within the common housing 3. The housing 3 contains both pairs of bearings 13–14 and 15–18 so that with suitably precise manufacture of the housing 3, the shafts 4 and 6 are automatically perpendicular to each other.

For balance, a counterweight 11 is displaceable along a rod 12, the axis of rod 12 being aligned with the polar axis 4, and counterweight 11 being rotatable about the axis of rod 12, such that the common center of gravity of the components 3, 10 and 11 may lie approximately on the polar axis 4.

Adjusted rotation of counterweight 11 is about rod 12, the latter being fixedly mounted to housing 3, at a suitable bearing 16.

The center of gravity of counterweight 11 is eccentric to rod 12, so that by adjusted rotation and longitudinal displacement of counterweight 11, the system may in all cases be balanced, through an accurate shifting of the common center of gravity into the polar axis 4.

The balancing procedure will now be described. First of all, a balancing of the telescope 10 about axis 6 is effected by adjusting means, not shown in the drawing. Thereupon, the shaft 6 is placed horizontal, with the line connecting the centers of gravity of the counterweight 11 and of the telescope 10 lying above the axis 4, in order to obtain high balancing sensitivity. A correctly oriented level (not shown) fastened to the housing 3 provides a helpful means of checking that this connecting line has been correctly placed in this horizontal position.

For the indicated horizontal positioning, equilibrium of moments is achieved via adjusted longitudinal positioning of counterweight 11 along rod 12, equilibrium being noted by observation of current consumption of motor 8, which current reduces to zero upon reaching equilibrium.

Having achieved balance for the horizontal orientation, the total structure is rotated 90° about the axis 4, i.e., to the vertical position shown in FIG. 1, and this position can also be checked by means of a level (not shown) fixedly mounted to housing 3.

For the indicated vertical positioning, equilibrium of moments is achieved by adjusted rotation of the counterweight 11 (the center of gravity of which is eccentric to rod 12), until the motor (8) current is observed to reach zero, at which point the common center of gravity of telescope 10, mount 3 and counterweight 11 is on axis 4, it being understood that a suitable signal transmitter (not shown) may respond to the zero-current condition, to provide a balance indication to the operator. Having performed these operations, the apparatus is balanced.

The two-axis mount described in this embodiment is particularly suitable for small and medium-size telescopes. It is obvious that, instead of the parallactic mounting mentioned here, azimuth mountings can also be provided with such a mount. It is furthermore possible to provide a tubular shaft 6, i.e., with a continuous central borehole, and to fasten the tube 10 of such a telescope to the flange 17, in such manner that operation of the telescope in Coudé focus is possible, i.e., that the observation beam is defelected by a mirror inclined to the optical axis of the telescope, through the shaft 6, and to the observer or to suitable recording devices.

What is claimed is:

1. As an article of manufacture, a two-axis telescope mount, comprising a rigid generally rectangular prismatic housing having first and second pairs of opposite side walls, a first-axis shaft journaled in a first pair of said walls and including means external of said housing for fixed-reference mounting of said shaft, a second-axis shaft journaled in a second pair of said walls and including means external of said housing for secure connection to a telescope, said shafts extending within said housing in orthogonally related directions and in close but clearance-offset relation to each other.

2. As an article of manufacture, a two-axis telescope mount, comprising a rigid housing having first and second pairs of opposite side-wall portions, a first-axis shaft journaled in said first pair of side-wall portions and including means external of said housing for fixed-reference mounting of said shaft, a second-axis shaft journaled in the second pair of side-wall portions and including means external of said housing for secure connection to a telescope, said shafts extending within said housing in orthogonally related directions and in close but clearance-offset relation to each other.

3. The article of claim 1 or claim 2, in which the externally extending end of each shaft carries a mounting flange, respectively for fixed-base connection and for telescope-mounting connection.

4. The article of claim 1 or claim 2, in which a separate drive motor is mounted to said housing at the opposite end of and in coupled relation to each shaft.

5. The article of claim 4, in which said other ends of said shafts project externally of said housing and their respective motors are mounted to the exterior of said housing.

6. The article of claim 1 or 2, and including a single balancing counterweight externally carried by said housing and having two degrees of freedom of adjustably securable displacement with respect to said housing.

7. The article of claim 1 or 2, in which said housing mounts an externally projecting rod for adjustable counterweight support, the axis of said rod being oriented to intersect the axis of said first shaft and being perpendicular thereto, said counterweight having a center of gravity that is eccentric to its rod-supported axis and being adjustably rotatable about and displaceable along said rod.

* * * * *